May 5, 1925.
J. Y. HARTMAN ET AL
1,536,845
VOLTAGE REGULATING MEANS FOR DIRECT CURRENT GENERATORS
Filed Sept. 19, 1923
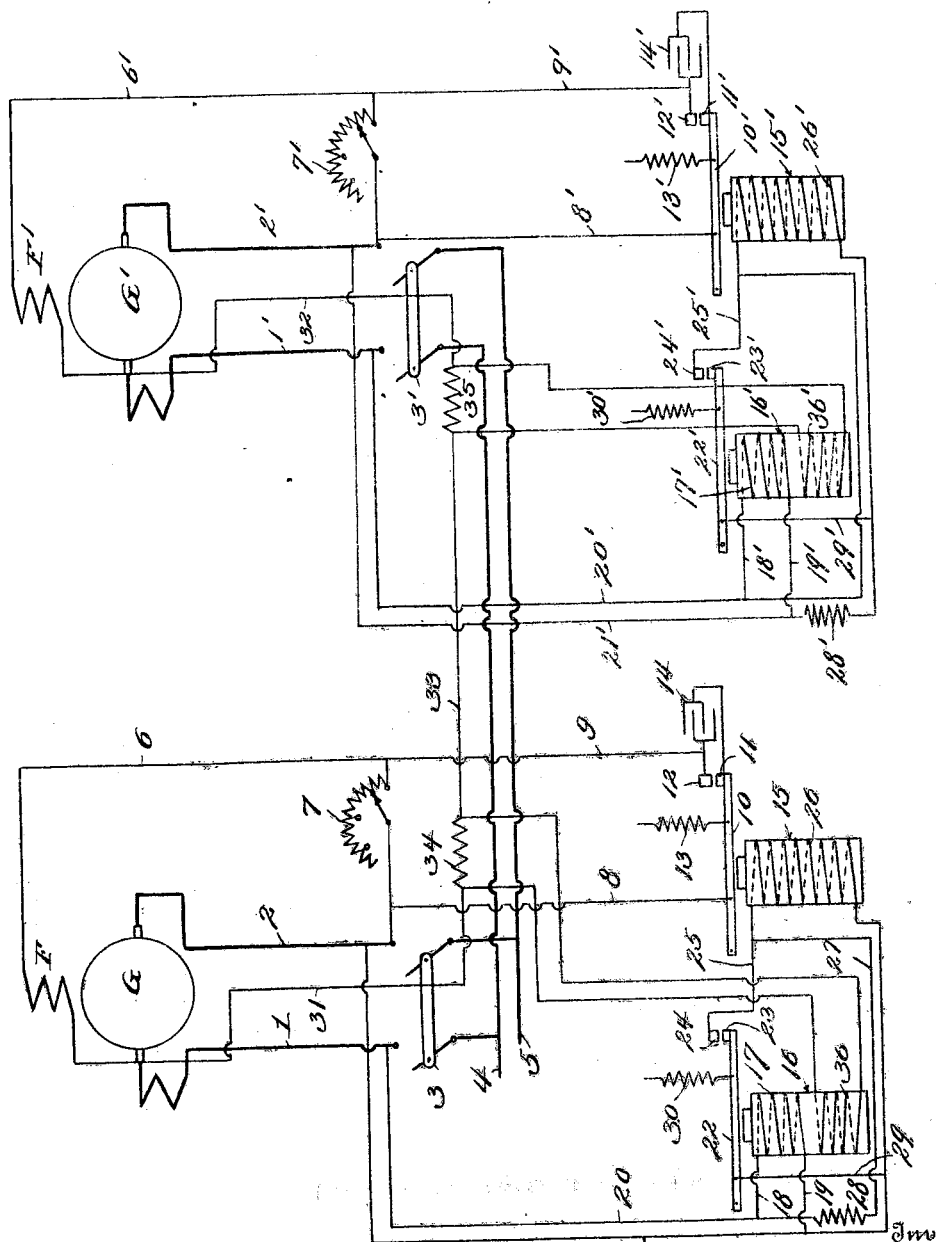
Inventor
Jacob Y. Hartman
Robert L. Fuller
By W. H. Cook
Attorney Patented May 5, 1925.

1,536,845

UNITED STATES PATENT OFFICE.

JACOB Y. HARTMAN, OF NEW ORLEANS, AND ROBERT L. FULLER, OF ARABI, LOUISIANA, ASSIGNORS OF ONE-THIRD TO WALTER H. COOK, OF NEW ORLEANS, LOUISIANA.

VOLTAGE-REGULATING MEANS FOR DIRECT-CURRENT GENERATORS.

Application filed September 19, 1923. Serial No. 663,639.

*To all whom it may concern:*

Be it known that we, JACOB Y. HARTMAN and ROBERT L. FULLER, citizens of the United States of America, residing, respectively, at New Orleans, in the parish of Orleans, State of Louisiana, and at Arabi, in the parish of St. Bernard, State of Louisiana, have invented certain new and useful Improvements in Voltage-Regulating Means for Direct-Current Generators, of which the following is a specification.

The present invention relates to electric regulators and the primary object is to provide novel and improved means capable of automatically regulating and stabilizing the voltage of direct current generators, whether operating singly or in multiple or parallel, to avoid the necessity of employing heavy and hence expensive equalizing connections between direct current generators operating in parallel and to prevent the exchange of current, beyond a predetermined limit, between direct current generators operating in parallel, to the end that each generator will bear its proportional part of the total load.

To these and other ends, the invention consists in certain improvements and combinations and arrangements, all as will be hereinafter more fully described, the features of novelty being pointed out particularly in the claims at the end of the specification.

In the accompanying drawings:—

The figure is a diagram of regulating apparatus constructed in accordance with the present invention and which may be used in part for the regulation of generators operating singly or in whole for the regulation of generators operating in multiple or parallel.

In applying the invention to the voltage regulation of a direct current generator operating singly, the generator G which may be of any direct current type having a shunt field F has its brushes connected to the leads 1 and 2 and these leads may be connected by a suitable switch 3 to the main line busbars 4 and 5. One of the terminals 6 of the shunt field winding F has a rheostat or other suitable resistance, which is preferably adjustable, inserted in series therewith. The rheostat 7 is adapted to be short circuited through leads 8 and 9 which are connected to the shunt field circuit of the generator at opposite sides of the rheostat and are connected, respectively, to an armature 10 carrying a contact 11, and to a cooperating contact 12. A tension spring 13 acts to engage the contacts 11 and 12 and to hold them in engagement, and a condenser 14 may bridge the contacts 11 and 12 to minimize arcing between them. The electro-magnet 15 co-operates with the armature 10, it acting, when sufficiently energized, to overcome the power of the spring 13 and thereby separate the contacts 11 and 12, the short circuit around the rheostat 7 being then broken so that the rheostat will be in series with the shunt field circuit of the generator G. The effect of breaking the short circuit around the rheostat is to reduce the field excitation and thereby reduce the voltage output of the generator. On the other hand, closing of the short circuit around the rheostat through engaging of the contacts 11 and 12, due to deenergization of the electro-magnet 15, has the effect of cutting the rheostat 7 out of the field circuit of the generator, whereby the field excitation and, in consequence, the voltage output of the generator will be increased.

The operation of the field regulating magnet 15 is controlled by an electro-magnet 16. This magnet has a coil 17 thereon connected by leads 18 and 19 to the leads 20 and 21, the latter being connected, respectively, to the armature leads 1 and 2 of the generator. The magnet 16 is provided with an armature 22 which carries a contact 23 arranged to cooperate with a contact 24, the latter being connected by a lead 25 to the coil or winding 26 on the magnet 15, the lead 25 being connected by a lead 27 to the lead 20 through a resister 28, the other terminal of the coil 26 being connected to the lead 21. The armature 22 also is connected by a lead 29 to the lead 21, and the armature is provided with a spring 30 which acts to engage the contacts 23 and 24.

The mode of operation of the regulating apparatus, when used for the regulation of one generator operating singly, is as follows: The winding 17 of the magnet 16 is energized from the main leads 1 and 2 of the generator G, whose voltage is to be controlled, and the magnet 16 attracts its armature 22, which, however, is restrained from movement by the spring 30 until the power of this spring is overcome by a sufficient magnetic force developed in the magnet 16, it being understood that the degree of energization of the magnet 16 varies with the voltage developed by the generator G. While the generator develops a voltage which is below a predetermined maximum, the contacts 23 and 24 will be in engagement, thus short circuiting the winding 26 of the magnet through the leads 25 and 29. In consequence, the spring 13 will hold the contacts 11 and 12 in engagement so that the rheostat in the field circuit of the generator will be short circuited through the leads 8 and 9, armature 10 and contacts 11 and 12. Should the voltage of the generator exceed the predetermined maximum, the winding 17 will energize the magnet 16 sufficiently to overcome the spring 30 and to attract the armature 22, in consequence of which the contacts 23 and 24 will be separated. The short circuit for the winding 26 of the magnet 16 will then be broken and the winding 26 will receive sufficient current from the leads 20 and 21 and through the resister 28 to energize the magnet 15 sufficiently to overcome the spring 13 and to attract its armature 10, thereby separating the contacts 11 and 12. When this occurs, the short circuit around the rheostat 7 is broken, and hence the rheostat 7 is connected in series with the shunt field circuit of the generator, it acting to lower the voltage developed by the generator until the spring 30 is able to retract the armature 22 in opposition to the magnetism of the magnet 16. When this occurs, the contacts 23 and 24 are engaged, thereby short circuiting the winding 26 of the magnet 15, in consequence of which the armature 10 will be retracted by its spring 13, causing the contacts 11 and 12 to come into engagement, as the result of which the rheostat 7 will be short circuited, thus allowing more current to flow through the shunt field of the generator and thereby raising its voltage until the magnet 16 again attains sufficient strength to overcome the action of the spring 30, whereupon the cycle of operation is repeated.

In applying the regulator to the voltage regulation and stabilization of two or more direct current generators operating in multiple or parallel, the installation may be substantially as is shown in the diagram. In such installation, each generator unit will be equipped susbtantially with regulating and controlling means similar to that provided for the generator G. For example, in the instance shown, two compound wound direct current generators are employed which are connected to operate in multiple or parallel, the second generator G' having the main leads 1' and 2', a switch 3' for connecting the main leads of this generator to the main line bus bars 4 and 5, a shunt field circuit 6' which includes the shunt field winding F' of this generator, a rheostat 7', leads 8' and 9' which, together with the armature 10' and contacts 11' and 12', provide means for short circuiting the rheostat, the spring 13' for the armature 10', condenser 14' which bridges the contacts 11' and 12', electromagnets 15' and 16', the winding 17' on the magnet 16' with its leads 18' and 19' connect such winding with the leads 20' and 21', which latter are connected to the main lead 1' and 2' of the generator G', the armature 22' for the magnet 16', the contacts 23' and 24' which are controlled by the armature 22', the lead 25' for one terminal of the coil 26' on the magnet 15', the other terminal of which coil is connected through a resister 28' to the lead 21', the lead 29' which connects the armature 22' with the lead 21' through the resister 28', and the spring 30' which acts on the armature 22'. Equalizing lines 31 and 32 which may be composed of conductors of small size, are connected to the generators G and G' and to an equalizing bus-bar 33 which may also be of small size, through resisters 34 and 35, these resisters being so proportioned that the flow of a predetermined amount of current through them will give a certain drop in voltage across them and this voltage will excite windings 36 and 36' respectively on the magnets 16 and 16'. The windings 36 and 36' are so connected that a flow of current through the resisters 34 and 35 to one generator or the other will cause the winding 36 to oppose the winding 17 and the winding 36' to assist the winding 17' when the current flow is in one direction, and vice versa when the current flow is in an opposite direction.

In using a voltage regulating and stabilizing installation for a plurality of generators, substantially as represented in the drawing, the operation is as follows: Supposing the voltage of generator G is lower than that of generator G', current will then flow through the equalizer from generator G' to generator G, the consequent drop in voltage across the terminals of the resister 35 causing the winding 36' to be energized to assist the winding 17' in overcoming the force of the spring 30' and opening the contacts 23' and 24', in consequence of which the magnet 26' will be fully energized, causing its armature 10' to open the contacts 11' and 12', the rheostat 7' or other resistance being thus introduced into the shunt field circuit of generator G', thus lowering the voltage developed by it. The equalizing current from generator G' flows also through the resister 34, creating a drop of potential across its terminals which energizes the winding 36 of the magnet 16, but the connections for the coil 36 are such that the energizing action of the winding 36 will oppose that of the winding 17 and the winding 36 will be energized sufficiently to neutralize or overcome the magnetism produced by the winding 17 sufficiently to cause the spring 20 to retract the armature 22 and thereby engage the contacts 23 and 24. The winding 26 of the magnet 15 is thereby short circuited so that its armature 10 will become retracted, thus engaging the contacts 11 and 12 and hence short circuiting the rheostat 7 or other resistance in the shunt field of the generator G, the result of which is to raise the voltage of the current developed by the generator G until a balance is obtained between the generators. If the voltage of the generator G' is lower than that of generator G, action similar to that above described will take place, although the energization of the winding 36 will act to assist the winding 17 of the magnet 16, thus causing the armature 22 to be attracted whereby the magnet 15 will be energized sufficiently to attract its armature 10 and thus insert the rheostat or resistance 7 in series with the field winding of the generator G while the winding 36' will be energized in a sense which will oppose the energization of the winding 17', in consequence of which the armature 22' will be retracted, causing the armature 10' of the magnet 15' to be retracted by its spring 13', in consequence of which the rheostat or resistance 7' in the field winding of the generator G' will be short circuited, thereby causing the voltage of the current developed by the generator G' to rise until a balance is obtained between the two generators.

While it is possible and practical to employ the resisters 34 and 35 in the balancing lines and to connect the terminals of the coils 36 and 36' to the equalizing circuit at opposite sides of the respective resisters, these resisters may be omitted, in which case the windings 36 and 36' will be connected in series with the respective equalizing lines 31 and 32, in which arrangement a very sensitive balance may be and has been maintained.

We claim as our invention:—

1. Voltage regulating and stabilizing means for a plurality of direct current generators connected in parallel comprising resistance means individual to the field circuit of each generator to be regulated, means for short-circuiting the respective resistance means, a balancing circuit connecting the generators, and controlling means for the respective short-circuiting means responsive to the voltage of its respective generator and also to a flow of current in the balancing circuit for causing the opening or closing of the short-circuit for the respective generator.

2. Voltage regulating and stabilizing means for a plurality of direct current generators connected in parallel, comprising resistance means for the field excitation circuit of each generator, means for short-circuiting the resistance in each generator field circuit, a balancing circuit connecting the generators, and means responsive to the voltage of the current generated by each generator and also responsive to a flow of current in the balancing circuit for controlling the field resistance short-circuiting means of the respective generators.

3. Voltage regulating and stabilizing means for a plurality of direct current generators connected in parallel, comprising a resistance adapted to be inserted in the field excitation circuit of each generator, means for short-circuiting each resistance, a balancing circuit connecting the generators, and electro-magnetic means having a winding connected in the balancing circuit and operative to control the resistance short-circuiting means for the respective generator according to the direction of flow of current in the balancing circuit.

4. Voltage regulating and stabilizing means for a plurality of direct current generators connected in parallel, comprising resistance means adapted to be inserted in the field excitation circuit of each generator, means for short-circuiting each of said resistance means, a balancing circuit connecting the generators and having resisters connected therein, and electro-magnetic means for controlling each short-circuiting means embodying a winding connected to the mains of the respective generator and having another winding connected to the balancing circuit at opposite sides of the respective resister and operative to assist or oppose the action of the first-mentioned winding according to the direction of flow of current in the balancing circuit.

5. Voltage regulating and stabilizing means for a plurality of direct current generators connected in parallel, comprising resistance means adapted to be connected in the field excitation circuit of each generator, short-circuiting means for each resistance including controlling contacts, electro-magnetic means connected to the mains of each generator and having an armature governing said contacts, short-circuiting means for said electro-magnetic means including controlling contacts, second electro-magnetic means having a winding connected to the mains of the respective generator, an armature cooperative with said second electro-magnetic means controlling the second-mentioned contacts, a balancing circuit connecting the generators, and a second winding on the second-mentioned electro-magnetic means connected in the balancing circuit and operative to assist or oppose the action of the first-mentioned winding according to the direction of flow of current in the balancing circuit.

In testimony whereof we have hereunto set our hands.

JACOB Y. HARTMAN.
ROBERT L. FULLER.

In presence of—
DANIEL WILKINSON,
HARRY SMITH.